Figure 5:
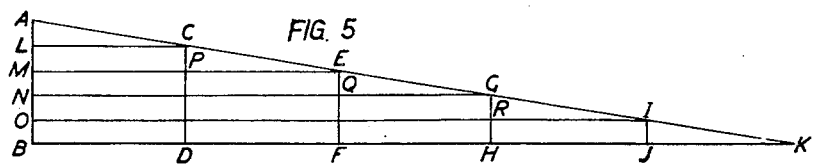

Oct. 29, 1957  E. W. PEPPER  2,810,961
INSTRUMENTS FOR DRAWING AND MEASURING ARCS
Filed Jan. 18, 1955  2 Sheets-Sheet 1
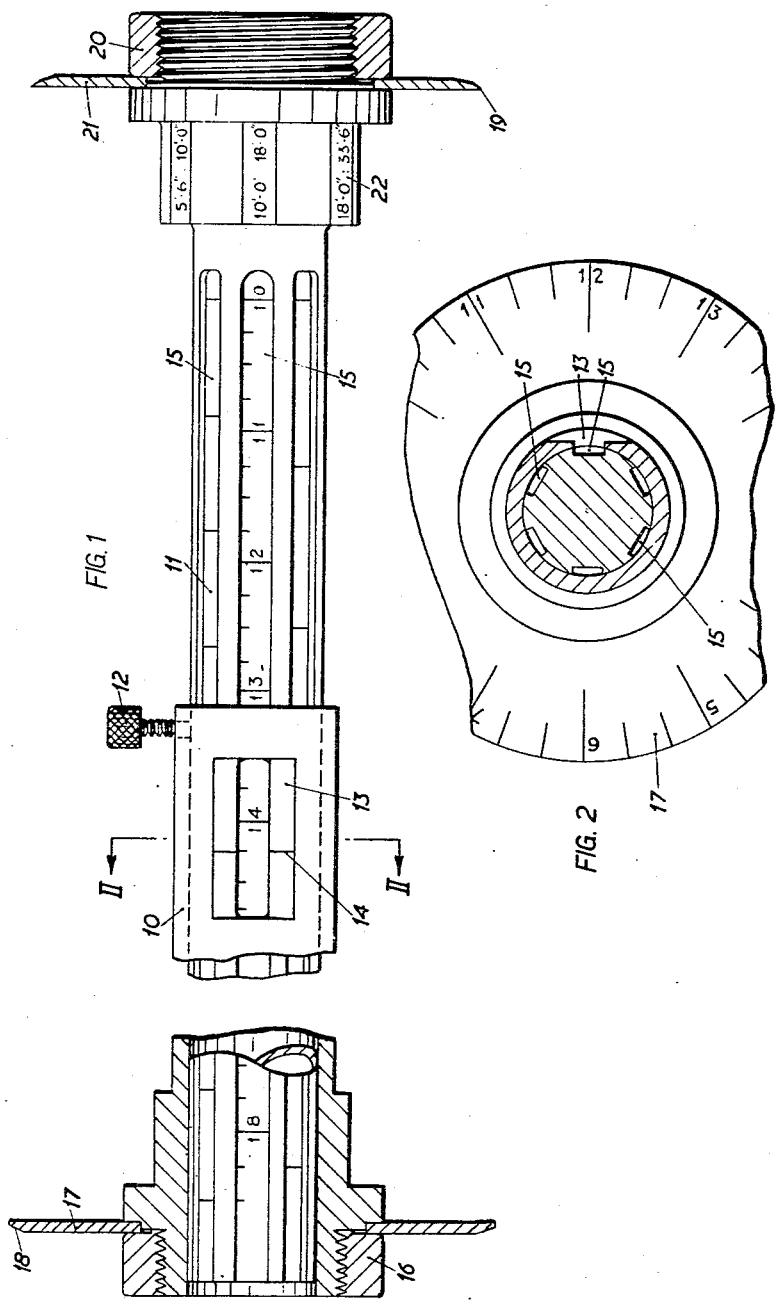
Inventor
ERNEST W. PEPPER
By Oct. 29, 1957 E. W. PEPPER 2,810,961
INSTRUMENTS FOR DRAWING AND MEASURING ARCS
Filed Jan. 18, 1955 2 Sheets-Sheet 2

Inventor
ERNEST W. PEPPER
By

United States Patent Office 2,810,961
Patented Oct. 29, 1957

2,810,961

INSTRUMENTS FOR DRAWING AND MEASURING ARCS

Ernest William Pepper, Southport, England, assignor of one-half to Triangle Products Limited, Manchester, England, a British company Application January 18, 1955, Serial No. 482,614

4 Claims. (Cl. 33—27)

This invention is for improvements in or relating to instruments for drawing or measuring arcs of circles.

An object of the invention is to provide an easily handled and compact instrument which can be used to draw arcs of very great radii, for example arcs having radii of the order of 5 feet 6 inches to 200 feet in radius.

According to the present invention there is provided an instrument for drawing or measuring arcs comprising a member having or adapted to have a wheel secured to each of its ends, one of said wheels being of less diameter than the other.

According to a further feature of the present invention there is provided an instrument for drawing or measuring arcs comprising a member adjustable in length and having, or adapted to have a wheel secured to each of its ends, one of said wheels being of less diameter than the other.

According to a still further feature of the present invention there is provided an instrument for drawing or measuring arcs comprising a member and several wheels of different diameters, any pair of which can be secured one to each end of said member.

According to a still further feature of the present invention there is provided an instrument for drawing or measuring arcs comprising a member adjustable in length and several wheels of different diameters, any pair of which can be secured one to each end of said member.

Conveniently the wheels have graduations extending circumferentially around them, the graduations on at least one wheel being units of length, e. g. inches or centimetres. Similarly, it is convenient to make the member on which the wheels are mounted in two parts movable relatively to one another for adjusting the length of said member, one of said parts being graduated in dimensions of length to a given scale and the other having an index working over said graduations. Means are provided for securing the two parts together in any position of adjustment.

In preferred embodiments of the invention the wheels have chamfered edges so as to make line contact with a surface over which the instrument is rolled.

The instrument may further comprise a marking device pivotally attached, or adapted to be pivotally attached to one end of the instrument so as to remain in a marking position relatively to a horizontal surface even although the instrument is rolled over said surface.

In use corresponding markings on the two wheels are placed on a base line and the instrument is then rolled over the surface bearing said base line, e. g. a sheet of paper. One of the wheels, generally the larger, will then strike out the required arc, the radius of this arc depending on the relative diameters of the two wheels and their distance apart. The length of the member (i. e. the distance apart of the wheels) is of course adjusted and the wheels are selected so as to give an arc of the required diameter. The length of the arc can be measured by the aid of the wheel marked off on its periphery in units of length.

The theory underlying the instrument according to the present invention invention is that if two wheels of different circumference are fixed to an axle a reasonable distance apart the device when rolled freely in one direction on a level surface will return to the starting position after moving along the path of a circle. The radius of the circle will depend on the distance apart of the wheels and their relative diameters. By using two wheels which vary in diameter but by only a small amount, it is possible to strike arcs of very large radii even although the spacing apart of the wheels is relatively small. This results in an instrument easy to handle and convenient for packing and carriage.

Figure 3:
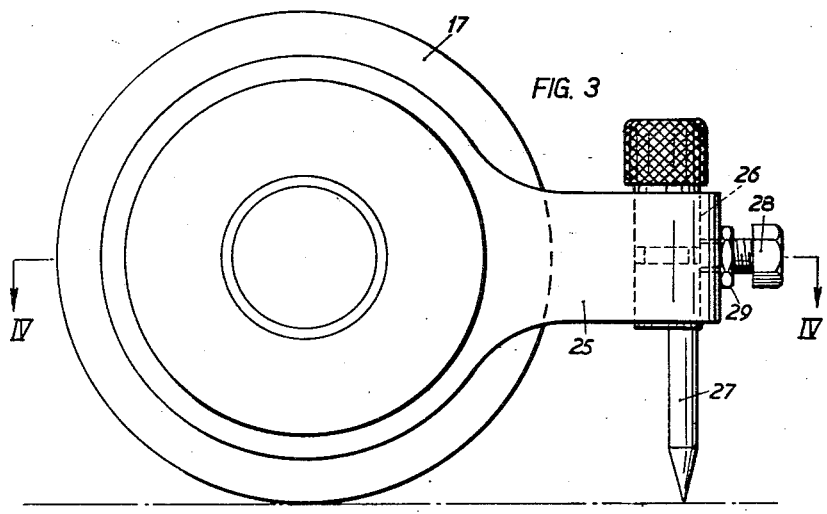
Figure 4:
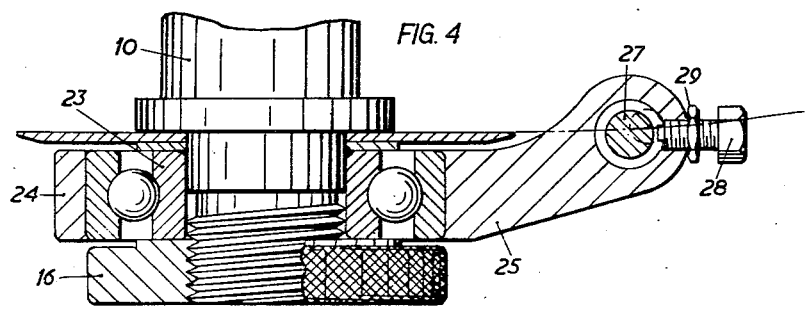

One specific embodiment of the invention will now be described, by way of example, with reference to the accompanying drawings wherein:

Figure 1 is a longitudinal elevation of the instrument, one end being shown in cross-section, Figure 2 is a cross-section on the line II—II of Figure 1, Figure 3 shows in end elevation a marking attachment for the instrument, Figure 4 is a sectional view on the line IV—IV of Figure 3, and Figure 5 is a diagram referred to later in explaining how the scale markings of the instrument are ascertained.

Referring first to Figures 1 and 2 of the drawings, the instrument comprises a main part or member in two parts 10 and 11 telescopically connected together so that the length of the member can be adjusted. The two parts 10 and 11 are adapted to be secured together in any position of longitudinal adjustment by means of a securing screw 12. The member 10 has an aperture 13 towards one of its ends the side faces of this aperture being provided with index markings 14. The index markings 14 are adapted to be located with respect to readings on any one of six longitudinal scales provided around the part 11, these scales being set in recesses 15 spaced circumferentially around the part 11. The scales are scales of feet to the inch or fraction of an inch or alternatively they could be in other units of length, e. g. metres and centimetres. These scales and the index markings 14 are to enable the length of the part 10, 11, and thereby the distance between two wheels 17 and 21, to be adjusted to that required to give an arc of the required radius.

Secured centrally on the free end of the member 10 by means of a knurled nut 16 is the wheel or disc 17 which is chamfered at 18 so as to provide it with a relatively sharp edge. The wheel 17 has a circumference the length of which is an exact number of units of measurement, e. g. inches or centimetres. In this particular example the wheel 17 has a circumference of 12 inches.

The free end of the part 11 is adapted to have secured centrally to it by means of a knurled nut 20 any one of a series of wheels or discs one of which is indicated at 21. The wheels 21 are of different diameters and are all less in diameter than the wheel 17. The wheels 21 are graduated circumferentially into equal parts by division markings inscribed on them. If, for instance, the disc 17 has a circumference of 12 inches and is divided up into inch markings, then the wheels 21 are correspondingly divided up circumferentially into twelve equal parts. The wheels 21 have relatively sharp edges as indicated at 19.

A boss 22 formed on the end of the part 11 adapted to carry the wheels 21 is marked around its circumference with figures indicating the ranges of the several longitudinal scales carried by the member 11. For instance, in the case shown in Figure 1 the scale set to read against the index 14 has a range of from 10 feet to 18 feet. Other scales can of course be brought into operative relationship with the markings 14 by turning the part 11 inside the part 10.

The instrument so far described is used as follows:

Presuming for example it is desired to draw an arc having a radius of 14 feet three inches, then the instrument is set as shown in Figure 1, a wheel 21 being selected which is marked to indicate that it corresponds with the scale range 10 feet to eighteen feet on the member 11. For other ranges of course other wheels 21 will be selected, all these being marked to indicate the scales on the member 11 to which they appertain.

The wheels 17 and 21 are located on the member 10, 11 so that their zero markings correspond, i. e. are in longitudinal alignment, and these two zero markings are set against a base line on, for example, the sheet of paper on which the arc is to be drawn. The instrument is then rolled freely over this sheet of paper and the wheel 17 will mark out an arc of the required radius. If desired the edge of the wheel 17 may be marked with plumbago or some other substance which will leave a clear line on the paper. Alternatively a sheet of carbon paper may be located between the wheel 17 and the paper on which the arc is to be drawn.

It will be appreciated that the length of the arc can be measured by counting the number of complete revolutions or part revolutions made by the wheel 17 and making use of the inch and fractions of an inch markings thereon.

It will also be appreciated that by drawing lines through corresponding parts on the arcs made by corresponding markings of the two wheels radial lines are obtained which will meet at the centre of the arc even although this centre may be far distant, e. g. 200 feet away. Production of radial lines in this way can be very useful in the preparation of perspective drawings.

In some cases instead of using one of the wheels as the marking device it may be desirable to provide the instrument with a pencil or scriber for effecting the marking operation. An arrangement of this nature is shown in Figures 3 and 4.

Referring to Figures 3 and 4, it will be noted that the knurled nut 16 is utilised to clamp the fixed part of a ball bearing 23 against the wheel 17. The rotatable part 24 of the ball race is provided with an arm 25 which has a socket 26 for a scriber or pencil 27. Conveniently, particularly in the case of a scriber, the scriber part proper is eccentric with respect to its part in the socket 26 so that by turning the part in the socket 26 the point of the scriber can be adjusted accurately into alignment with the edge of the wheel 17. After this has been done the part within the socket 26 is secured therein by means of a clamping screw 28 and lock nut 29.

In the particular example of the invention given on the drawing, which provides for the drawing and measuring of arcs having radii of from 5 feet 6 inches to 200 feet, the telescopic member 10, 11 provides for a maximum spacing of the wheels 17 and 21 of 28½″ and a minimum spacing of 15 3/16″, the scales in the recesses 15 having a total length of 13 5/16″. The wheel 17 as previously stated, has a circumference of 12″ and conveniently there are six of the alternative wheels 21 as follows:

9.2″ circumference giving a range of 5′ 6″ to 10′ 0″.
10.5″ circumference giving a range of 10′ 0″ to 18′ 0″.
11.175″ circumference giving a range of 18′ 0″ to 33′ 6″.
11.550″ circumference giving a range of 33′ 6″ to 62′ 0″.
11.750″ circumference giving a range of 62′ 0″ to 112′ 0″.
11.860″ circumference giving a range of 112′ 0″ to 200′ 0″.

Referring to Figure 5 of the drawings, the scale, for the particular instrument just described and with the wheel 21 having a circumference of 9.2″, can be ascertained as follows:

$AB$=radius of wheel 17=1.909091″.
$CD$=radius of wheel 21=1.463636″.
$BD$=represents a spacing apart of the two wheels of 15″.
$ABK$=90°.

$BK$=radius of arc which the instrument will draw with this setting.
AK is drawn through C to meet line BK at K.
EF, GH and IJ are 90° to BK and 15 inches apart.
CL, EM, GN and IO are parallel to BK.
Then, as ABK is a right-angle triangle $AL=CP=EQ=GR$, i. e. 1.909091″ minus 1.463636″=0.445455″.
Further, as triangles ALC, CPE, EQG, GRI and IJK have similar angles:

$$AL:LC::AB:BK$$

i. e. $0.445455″:15″::1.909091″:BK$
Therefore $BK=64.2855″=5′\ 4.2855″$.

The same method can be used to establish that the maximum spacing apart of the two wheels i. e. 28″ gives a radius of 10 feet. The difference between 10′ 0″ and 5′ 4.2855″ i. e. 4′ 7.7145″ taken in conjunction with the difference between the wheel spacings 15″ and 28″ (i. e. 13″) gives a scale of 2.8″=1 foot of radius.

I claim:
1. An instrument for drawing or measuring arcs comprising a member in two parts telescoped one into the other so that the length of said member may be adjusted and one part can also be adjusted angularly relatively to the other part about the axis of the member, means for securing the two parts together in any position of adjustment, a series of different, longitudinally extending scales of length spaced circumferentially around one of said parts and each constituting an extension of the range of the preceding scale, an index on the other part which works against any one of said scales according to the angular adjustment of one part relatively to the other, a wheel secured to the end of one of said parts, a series of alternative wheels all of different diameters and all of less diameter than said first mentioned wheel and each appropriate to the range of one of said scales, and means for securing any one of said alternative wheels on the other part.

2. An instrument for drawing or measuring arcs comprising a member in two parts telescoped one into the other so that the length of said member can be adjusted and one part can also be adjusted angularly relatively to the other part about the axis of the member, means for securing the two parts together in any position of adjustment, a series of different, longitudinally extending scales of length spaced circumferentially around one of said members and each constituting an extension of the range of the preceding scale, an index on the other part which works against any one of said scales according to the angular adjustment of one part relative to the other, a wheel secured to the end of one of said parts and having its circumference graduated in units of length, a series of alternative wheels all of different diameters and all of less diameter than said first mentioned wheel and each appropriate to the range of one of said scales, and means for securing any one of said alternative wheels on the other part with a zero mark on its circumference in alignment with a zero mark on the first mentioned wheel.

3. An instrument as claimed in claim 1 wherein the index is on a chamfered edge of a window-aperture formed towards the extremity of the outer of the two parts telescoped together.

4. An instrument as claimed in claim 2 wherein the index is on a chamfered edge of a window-aperture formed towards the extremity of the outer of the two parts telescoped together.

References Cited in the file of this patent
UNITED STATES PATENTS

| Number | Name | Date |
|---|---|---|
| 211,825 | Worthington | Jan. 28, 1879 |
| 390,360 | Gieseler | Oct. 2, 1888 |
| 683,780 | Modjeski | Oct. 1, 1901 |

FOREIGN PATENTS

| 201,195 | Canada | June 22, 1920 |
|---|---|---|